Feb. 25, 1958  H. H. PORTER  2,824,711
VEHICLE FOR TESTING CONTROL SYSTEMS AT SUPERSONIC SPEEDS
Filed March 22, 1950  2 Sheets-Sheet 1

INVENTOR.
HENRY H. PORTER
BY
ATTORNEY

Feb. 25, 1958  H. H. PORTER  2,824,711
VEHICLE FOR TESTING CONTROL SYSTEMS AT SUPERSONIC SPEEDS
Filed March 22, 1950  2 Sheets-Sheet 2
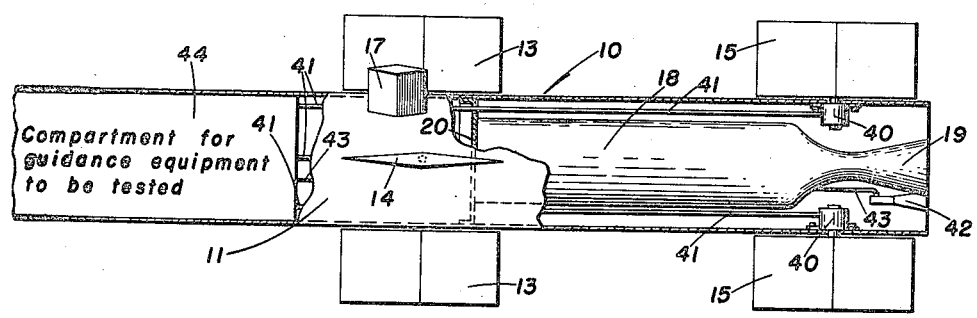
INVENTOR.
HENRY H. PORTER
BY
ATTORNEY United States Patent Office 2,824,711
Patented Feb. 25, 1958

2,824,711

VEHICLE FOR TESTING CONTROL SYSTEMS AT SUPERSONIC SPEEDS

Henry H. Porter, Washington, D. C., assignor to the United States of America as represented by the Secretary of the Navy Application March 22, 1950, Serial No. 151,115

3 Claims. (Cl. 244—14)

The present invention relates to a vehicle wherein experimental control systems for jet-propelled aerial projectiles may be mounted and tested while in supersonic flight.

Due to difficulties encountered in aerodynamics at supersonic speeds, the development of such control systems is advantageously broken down into two stages, the first, which forms the subject matter of another case of the same inventor, of even date herewith, dealing with subsonic speeds only, the second extending it to supersonic speeds. After equipment has successfully passed through the subsonic tests, it is further tested at supersonic speeds, thus resulting in economy of time and materials, by weeding out the relatively simpler subsonic defects before the equipment is subjected to the more exacting supersonic tests. The present invention concerns the provision of test vehicles suitable for the second, supersonic, stage of such investigations.

An object of the invention, therefore, is to provide a rocket-propelled vehicle designed to accommodate equipment that is to be tested at supersonic speeds.

Another object of the invention is to provide a supersonic test vehicle which incorporates a set of launching rockets for bringing it up to operating speed, and means for freeing the launching rockets when spent, after which a sustaining rocket maintains propulsion of the vehicle, which has been lightened by thus discarding its launching means.

Other objects and many of the attendant advantages of this invention will be appreciated readily as the same becomes understood by reference to the following detailed description, when considered in connection with the accompanying drawings, wherein:

Fig. 4 is a fragmentary side elevation on the same scale as Fig. 2, without the launching means, and with the rear portion of the casing cut away to show the internal structure;

Fig. 5 is the rear end elevation corresponding to Fig. 4;

Fig. 6 is the rear end elevation corresponding to Fig. 2; and

Fig. 7 is a fragmentary section in the plane 7—7 through the structure shown in Fig. 6.

Figure 1:
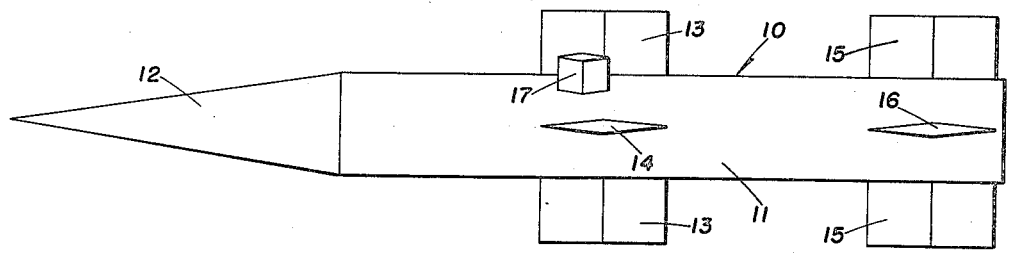
Fig. 1 is a side elevation of a test vehicle, embodying the invention, designed for use at supersonic speed.

Referring first to Fig. 1, the vehicle, designated as a whole by reference character 10, comprises a body 11 having a conical nose 12, which provides space for the equipment that is to be tested.

Two pairs of airfoils 13, 14, and 15, 16 of rhombohedral cross section are provided, that is, the section through each such airfoil is a narrow diamond, with its long diagonal normally parallel to the axis of the vehicle. As shown, the airfoils 13 and 15 are in the vertical plane while the airfoils 14 and 16 are horizontal. In addition to these relatively large airfoils, a pair of smaller airfoils 17 is also provided, for roll-control. These are arranged in the 45° plane, angularly halfway between airfoils 13 and 14 and at approximately the same location along the vehicle as said airfoils 13 and 14.

A single sustaining rocket 18 having a rearwardly directed nozzle 19 is mounted in the rear portion of the vehicle, as best shown in Fig. 4. The forward end of said rocket exerts its thrust against a partition or bulkhead 20, shown in dotted lines.

Figure 2:
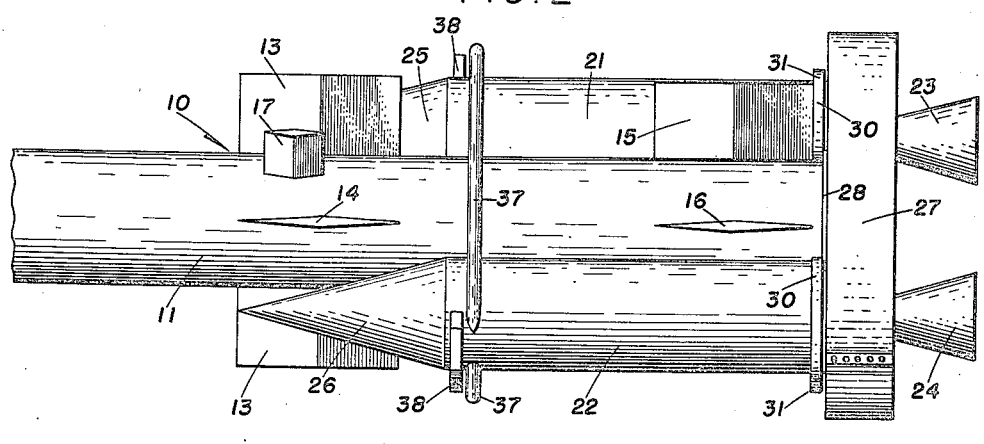
Fig. 2 is a fragmentary side elevation on an enlarged scale, showing the test vehicle of Fig. 1 with a launching means attached to its rearward portion, and comprising a pair of rockets.

Launching rockets 21, 22, shown in Figs. 2, 3, 6 and 7, are mounted outside the body 11 of the vehicle and parallel thereto. These rockets have the exhaust nozzles 23 and 24 respectively, which extend rearward, preferably somewhat beyond the nozzle 19 of the sustaining rocket, as best shown in Fig. 2. Each of the launching rockets 21 and 22 is provided with a forwardly directed conical nose, 25 and 26 respectively, to decrease its air drag at supersonic speed.

The launching rockets are mounted in a carriage comprising a large ring 27 which surrounds a yoke 28 having a central opening 29 through which passes the discharge nozzle 19. The portion of said yoke around said opening bears against the rear end of the vehicle body 11 and is designed ot transmit the thrust of the launching rockets thereto.

Immediately forward of said yoke 28 are two metal straps, 30, 30, each encircling a corresponding one of the rockets 21 and 22, and firmly secured thereto, as by welding, as best shown in Fig. 6. After encircling its rocket, the ends of each strap are bent outward nearly at right angles, and then back on themselves to form two loops 31, the ends of the strap touching its circular portion tangentially and being welded thereto as at 32, 32.

The ring 27 is made in halves, each half having a substantially radial flange 33, at each end, the corresponding pairs of companion flanges abutting opposite faces of interposed spacing blocks 33a, said blocks 33a being extended beyond the forward face of the ring and entered between the looped end portions of the straps 30, whereupon screws or rivets 34 are passed through the straps, spacing blocks, and flanges to secure all said parts as shown in Fig. 6, with the outer ends of the looped portions forming rectangular guide notches 35, for a purpose that will be explained hereinafter. The remaining portions of the flanges are likewise riveted or bolted together, as at 36.

Figure 3:
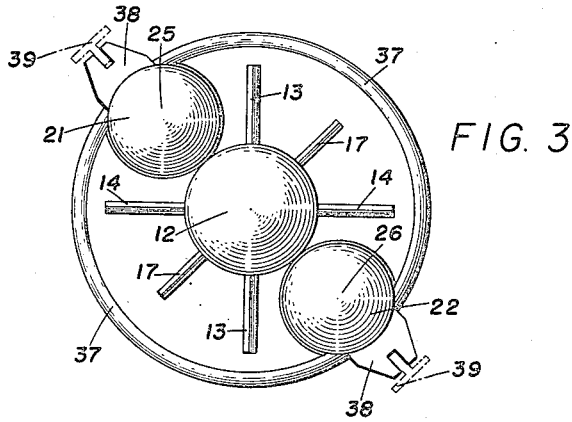
Fig. 3 is the front elevation corresponding to Fig. 2.

Referring now to Figs. 2, 3 and 6, it will be noted that manifolds 37, 37 connect launching rockets 21 and 22 at their forward ends, said rockets and manifolds jointly forming a ring of sufficient inside diameter to clear all the airfoils 15 and 16. These manifolds serve also as spacers for the rockets 21 and 22, to hold them on opposite sides of the body 11. Secured to each rocket 21 and 22 near the forward end of its cylindrical portion, as by welding, is a notch-plate 38, which in cooperation with the corresponding notch 35 formed at the rear of the rocket between the looped ends of the strap 30, provides guidance for the vehicle at launching. This is accomplished by the stationary rails 39, 39 shown in dot-dashed lines in Figs. 3, 6 and 7.

While it is not within the province of the present invention to specify just what operating means and controls are contained within the body of the vehicle 10, for completeness it may be desirable to state that each airfoil 13, 14, 15, 16 and 17 is mounted to pivot independently about its own longitudinal axis, to control the direction of travel and roll tendency of the vehicle, and mechanism 40, 41 is indicated generally in Figs. 4 and 5 for turning these airfoils in response to control movements produced by the equipment under test, within the conical nose 12. This equipment may, for example, include a servo mechanism 44 that will impart suitable rotary or linear motions to the rods or shafts 41, which in turn will produce rotation in the airfoil-turning devices 40, to deflect such airfoils correspondingly. The equipment under test will presumably in turn itself be controlled by radio signals received by the vehicle, and for this purpose horn antennae 42, 42 with connecting conductors 43 leading to the mechanism 44 are also shown.

In operation, the vehicle is mounted on the rails 39, 39 of the launcher, which is ordinarily a structure mounted permanently on the terrain or on the deck of a vessel. The vehicle is thus free to slide along said rails when the launching rockets 21 and 22 have been ignited and are delivering their thrust.

It will be noted that there is no positive or rigid mechanical connection between the launching carriage and the vehicle 10, which merely rests against the yoke 28 and lies between the two launching rockets 21 and 22, so that it is free to move forward and leave said launching carriage behind. This happens when the launching rockets 21 and 22 are spent and sustaining rocket 18 has been ignited and is providing the thrust. The air drag will then cause the spent launching carriage to slow down and drop off, thus leaving the vehicle 10 unencumbered by needless dead weight.

Obviously many modifications and variations of the present invention are possible in the light of the above teachings. It is therefore to be understood that within the scope of the appended claims the invention may be practiced otherwise than as specifically described.

What is claimed is:

1. A self-propelled, guided aerial vehicle comprising an elongated hollow body, a transverse bulkhead in said body dividing it into two chambers, signal energized control equipment for the vehicle housed in the forward chamber, a sustaining rocket in the rear chamber, the forward end of said rocket abutting said bulkhead to apply the propelling thrust of said rocket thereto, a plurality of airfoils pivotally mounted on said body adjacent the midsection thereof, a second group of airfoils pivotally mounted on said body adjacent the rear end thereof, mechanical rotating means within the body for rotating said airfoils, said mechanical means being responsive to said control equipment, and means for initially launching said vehicle.

2. A self-propelled aerial vehicle as defined in claim 1, wherein the airfoils are of narrow rhombohedral shape, normally presenting their long diagonals in planes axial to the vehicle casing.

3. A self-propelled guided missile comprising an elongated hollow body, a transverse bulkhead dividing said body into a plurality of chambers, signal energized control equipment for said missile housed in the forward chamber, antennae mounted in the rear end of said body, connections from said antennae to said control equipment, a plurality of pairs of airfoils pivotally mounted on said body adjacent the midsection thereof, a second plurality of pairs of airfoils pivotally mounted on said body adjacent the rear end thereof, mechanical rotating means mounted in said body and connected in driving relation to said airfoils, said mechanical means being actuated by said control equipment to position said airfoils to guide said missile, and a sustaining rocket in the rear chamber.

References Cited in the file of this patent

UNITED STATES PATENTS

| | | |
|---|---|---|
| 1,102,653 | Goddard | July 7, 1914 |
| 1,879,187 | Goddard | Sept. 27, 1932 |
| 2,062,495 | Brayton | Dec. 1, 1936 |
| 2,070,946 | Joyce | Feb. 16, 1937 |
| 2,485,601 | Hickman | Oct. 25, 1949 |

OTHER REFERENCES

"The Launching of Guided Missiles," Coast Artillery Journal, March-April 1947, pages 15-20.